United States Patent [19]

Oberrecht et al.

[11] 4,229,024

[45] Oct. 21, 1980

[54] SWIVEL CONNECTOR

[75] Inventors: David A. Oberrecht, Cincinnati; Fred A. Wilson, Middletown, both of Ohio

[73] Assignee: Dover Corporation, New York, N.Y.

[21] Appl. No.: 936,829

[22] Filed: Aug. 25, 1978

[51] Int. Cl.² ............... F16L 17/00; F16L 27/00; F16L 33/16

[52] U.S. Cl. ................... 285/98; 285/281; 285/DIG. 10; 285/422

[58] Field of Search ......... 285/98, 281, 276, DIG. 10, 285/280, 277

[56] References Cited

U.S. PATENT DOCUMENTS

| | | | |
|---|---|---|---|
| 2,958,927 | 11/1960 | Kravats | 285/DIG. 10 |
| 2,963,304 | 12/1960 | Comlossy et al. | 285/98 |
| 3,011,803 | 12/1961 | Buckner et al. | 285/98 X |
| 3,392,993 | 7/1968 | Myers | 285/281 X |
| 3,504,935 | 4/1970 | Gullihur | 285/98 X |
| 3,532,364 | 10/1970 | Snyder, Jr. | 285/98 |
| 3,997,198 | 12/1976 | Linder | 285/281 X |
| 4,079,969 | 3/1978 | Wilson et al. | 285/98 |

FOREIGN PATENT DOCUMENTS

| | | | |
|---|---|---|---|
| 267695 | 4/1965 | Australia | 285/98 |
| 2311978 | 12/1976 | France | 285/276 |
| 417249 | 1/1967 | Switzerland | 285/276 |

Primary Examiner—Roy D. Frazier
Assistant Examiner—Carl F. Pietruszka
Attorney, Agent, or Firm—Kinney & Schenk

[57] ABSTRACT

A swivel connector between a hose reel and a source of product has a first body secured to the source of product and a second body secured to the hose reel. The first body has a plurality of stepped bores cooperating with various outer surfaces of the second body. A pair of non-metallic, non-corrosive bearings is disposed between two different stepped bores and two different outer surfaces with a seal ring disposed therebetween. A plastic thrust ring is disposed between a shoulder of the first body and a first surface of a thrust flange of the second body to absorb the thrust due to relative movement of the second body into the first body. The thrust flange has a second surface, which is parallel to the first surface, against which a first wear ring bears. The first wear ring has a plurality of balls bearing thereagainst on its side remote from the thrust flange. A retainer is supported on the first body and has a flange providing a surface against which a second wear ring abuts. The second wear ring also bears against the balls, which absorb the thrust due to relative movement of the second body out of the first body. The two non-metallic, non-corrosive bearings absorb the bending loads.

10 Claims, 2 Drawing Figures

SWIVEL CONNECTOR

When delivering jet fuel to a jet aircraft, for example, it is necessary to have a relatively long hose, which is normally mounted on a reel.

Therefore, to obtain the relatively light weight, prior swivel connectors of this type have utilized aluminum bodies. However, the prior swivel connectors with aluminum bodies have had the disadvantage of wear occurring because of the steel balls of the ball bearing means bearing against surfaces of the aluminum bodies. Thus, the life of the swivel connector has been reduced because of this wear.

In one prior swivel connector, both the bending and thrust loads have been supported solely by the balls. This has increased the wear of the bodies because of the point contact between the balls and each of the bodies due to the bending loads. Therefore, the bending loads have not been supported over any relatively large surface area to reduce the amount of load at any specific point.

The present invention overcomes the foregoing problems through providing a swivel connector in which the ball bearing means supports only the thrust load and the bending load is supported by a pair of separate bearings. Thus, each of the separate bearings extends over a substantial surface area to reduce the load at any specific point on either of the bodies of the swivel connector to reduce wear of each of the bodies.

The present invention also utilizes bearings, which do not require any lubrication, are non-metallic, and are non-corrosive. This prevents any contamination by the bearings of the jet fuel with which one of the bearings is in contact.

The present invention also reduces the possibility of wear on the bodies because of the balls. The present invention uses wear rings between the balls and the elements of the swivel connector subjected to the thrust load. The wear rings are formed of a metal which will not wear significantly when the balls of steel rub thereagainst. One suitable example of the wear rings is steel. Even if the wear rings wear, they are easily replaced through removing a retainer. Thus, this extends the life of the swivel connector of the present invention.

An object of this invention is to provide an improved swivel connector.

Another object of this invention is to provide a swivel connector having a relatively long life.

A further object of this invention is to provide a swivel connector in which there is no metal to metal contact between any rotating parts of the swivel connector.

Still another object of this invention is to provide a swivel connector having a relatively large area for supporting bending loads.

A still further object of this invention is to provide a swivel connector having separate bearing means to support bending and thrust loads.

Further objects, uses, and advantages of this invention are apparent upon a reading of this description, which proceeds with reference to the drawing forming part thereof and wherein.

Figure 1:
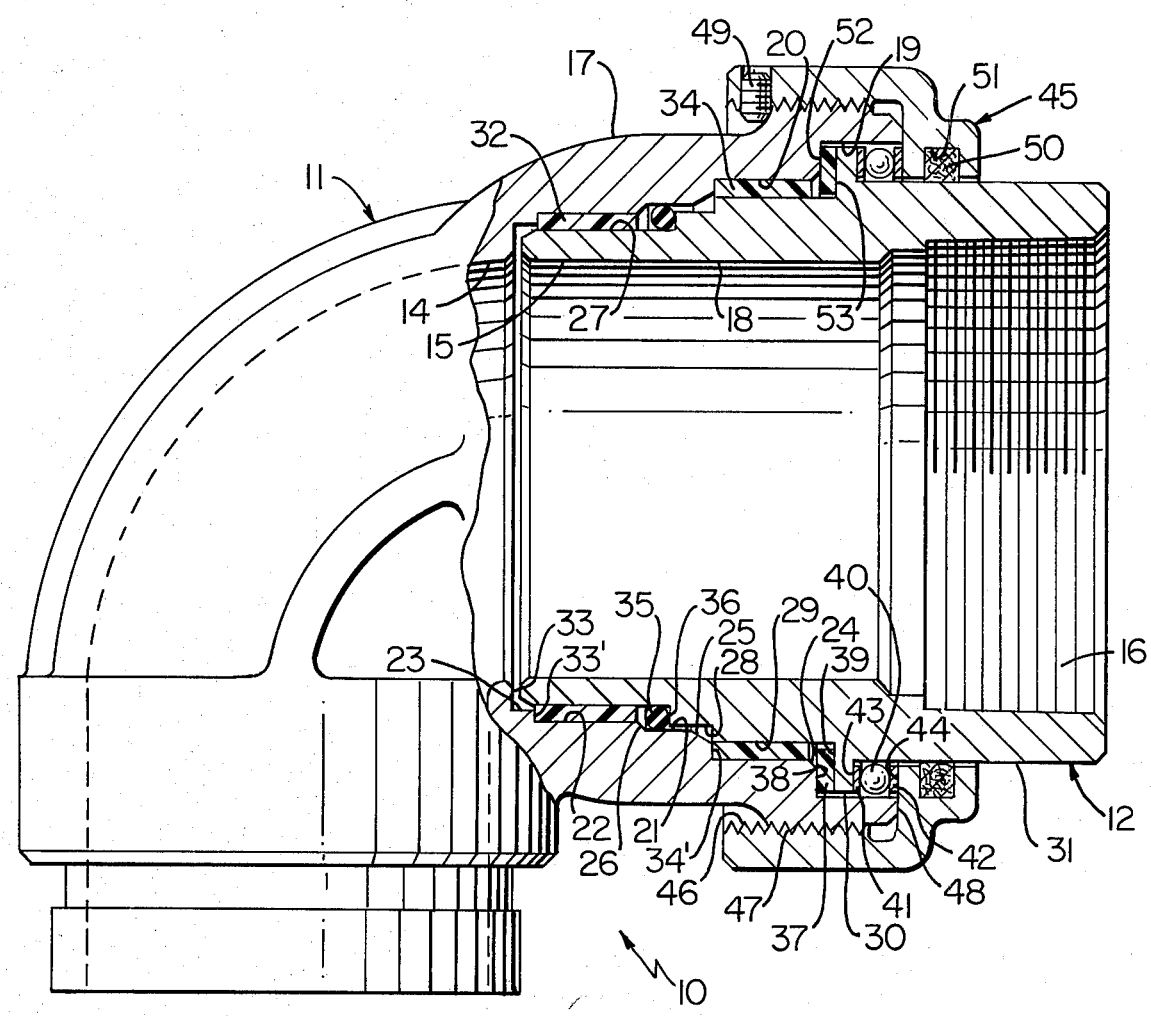
FIG. 1 is a sectional view, partly in elevation, of the swivel connector of the present invention.

Referring to the drawing and particularly FIG. 1, there is shown a swivel connector 10 including a first body 11 and a second body 12. The bodies 11 and 12 are rotatably connected to each other.

Each of the bodies 11 and 12 is formed of a lightweight material such as aluminum, for example. The second body 12, which is the tail of the swivel connector 10, has its outer surface anodized and impregnated with Teflon to form a hard, low friction surface.

The first body 11 has a passage 14 extending therethrough and has its outlet aligned with a passage 15 extending through the second body 12. The passage 15 has a larger cross section at its end remote from the passage 14, to which a flexible hose, for example, is connected. The flexible hose would be wound on a reel on a carrier and have its other end connected to a nozzle.

The second body 12 has threads 16 on its inner surface to threadedly receive the hose. Thus, the passage 15 communicates with the passage in the hose (not shown).

The first body 11 has an end of a pipe (not shown) connected thereto. The pipe would have its other end connected to a source of fuel, for example.

The first body has a portion 17 disposed in overlapping relation with a portion 18 of the second body 12. The portion 17 of the first body 11 has its inner surface always radially spaced from the outer surface of the portion 18 of the second body 12, as shown in FIG. 1, to prevent any metal to metal contact therebetween.

The portion 17 of the first body 11 is formed with stepped bores 19, 20, 21, 22, and 23 therein. The bores 19, 20, 21, 22, and 23 form an axial bore extending through the first body 11 and communicating with one end of the passage 14, which has a smaller diameter than any of the bores 19, 20, 21, 22, and 23. The bore 19, which is the largest of the five stepped bores 19, 20, 21, 22, and 23, is adjacent the distal end of the first body 11 while the bore 23, which is the smallest of the five stepped bores 19, 20, 21, 22, and 23, is closest to the outlet of the passage 14 aligned with the passage 15.

The portion 17 of the first body 11 has a first chamfer 24 between the bores 19 and 20. A second chamfer 25 in the portion 17 of the first body 11 extends between the bores 20 and 21. A third chamfer 26 is formed in the portion 17 of the first body 11 between the bores 21 and 22.

The second body 12 has a plurality of stepped outer surfaces 27, 28, 29, 30, and 31. The outer surface 27, which has the smallest diameter of the outer surfaces 27–31 of the second body 12, is at the distal end of the overlapped portion 18 of the second body 12 and has a portion of its length opposite the entire length of the bore 22 in the portion 17 of the first body 11, a portion of its length opposite the third chamfer 26 in the portion 17 of the first body 11, and the remainder of its length opposite a portion of the length of the bore 21 in the portion 17 of the first body 11.

The outer surface 28, which has a larger diameter than the outer surface 27, has a portion of its length opposite a portion of the length of the bore 21 in the portion 17 of the first body 11 and the remainder of its length opposite the entire length of the second chamfer 25 in the portion 17 of the first body 11.

The length of the outer surface 29, which has a larger diameter than the outer surface 28, has a portion disposed opposite the entire length of the bore 20 in the portion 17 of the first body 11, a portion opposite the entire length of the first chamfer 24 in the portion 17 of the first body 11, and a portion opposite a first portion of the length of the bore 19 in the portion 17 of the first body 11.

The entire length of the outer surface 30, which is the largest diameter of the second body 12 and is formed by a flange on the second body 12, extends opposite a second portion of the length of the bore 19 in the portion 17 of the first body 11.

The outer surface 31, which has a smaller diameter than the outer surface 30 but a larger diameter than the outer surface 29, has a portion of its length extending opposite the remainder of the length of the bore 19 in the portion 17 of the first body 11. The remainder of the length of the outer surface 31, which has a diameter substantially the same as the diameter of the bore 20 in the portion 17 of the second body 11, extends beyond the distal end of the portion 17 of the first body 11.

A first non-metallic, non-corrosive bearing 32 is disposed between the bore 22 in the portion 17 of the first body 11 and the outer surface 27 of the second body 12. The bearing 32 communicates with the liquid, which is a jet fuel, for example, flowing through the passages 14 and 15 because of the spacing of the end of the second body 12 from a shoulder 33 in the first body 11. Thus, the bearing 32 must be formed of a material which will not contaminate the jet fuel but does not require lubrication. One suitable example of the bearing 32 is an epoxy-glass filament wound composite backed bearing with a polytetrafluoroethylene liner sold by Garlock Bearings as Gar-Fil bearing number GF5660-12. Any other bearing capable of not contaminating the liquid flowing through the passages 14 and 15 and not requiring lubrication may be employed.

The location of the bearing 32 adjacent the inner end of the second body 12 enables bending of the swivel connector 10 to be supported by the bearing 32. The bearing 32 has one end bearing against a shoulder 33', which joins the bores 22 and 23, in the portion 17 of the first body 11.

Bending also is supported by a second non-metallic bearing 34, which is the same as the bearing 32. The bearing 34 is disposed between the bore 20 in the portion 17 of the first body 11 and the outer surface 29 of the second body 12. The bearing 34 has one end bearing against a shoulder 34', which joins the bore 20 and the second chamfer 25, in the portion 17 of the first body 11.

The bearing 32 has a light press fit within the bore 22 in the portion 17 of the first body 11. Similarly, the bearing 34 has a light press fit within the bore 20 in the portion 17 of the first body 11.

An O-ring 35 is located between the bearings 32 and 34 and is between a portion of the bore 21 in the portion 17 of the first body 11 and a portion of the outer surface 27 of the second body 12. The O-ring 35 also bears against a shoulder 36, which is formed in the portion 18 of the second body 12 between the outer surfaces 27 and 28. The O-ring 35 forms a seal to prevent any fluid leakage between the first body 11 and the second body 12.

A thrust ring 37, which is formed of a suitable plastic such as nylon, for example, is disposed between a shoulder 38 in the portion 17 of the first body 11 and a shoulder 39 in the portion 18 of the second body 12. The shoulder 38 extends between the bores 19 and 20 in the portion 17 of the first body 11 while the shoulder 39 extends between the outer surfaces 29 and 30 of the portion 18 of the second body 12. The shoulders 38 and 39 are substantially parallel to each other and form faces against which the thrust ring 37 bears. Thus, the thrust ring 37 applies the thrust between the first body 11 and the second body 12.

Figure 2:
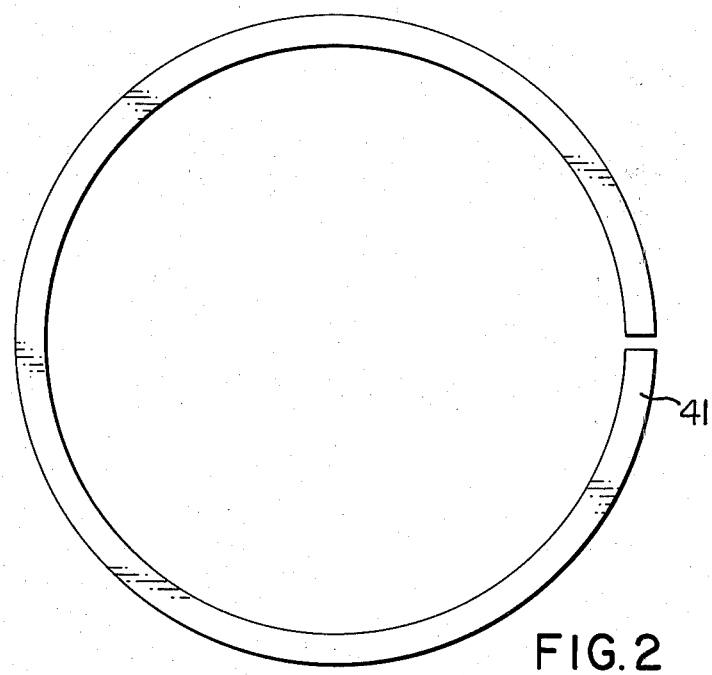
FIG. 2 is a plan view of a wear ring used in the swivel connector of the present invention.

The thrust load is supported by a plurality of balls 40, which are disposed between a pair of wear rings 41 and 42, which are the same and formed of steel, as shown in FIG. 1. As shown in FIG. 2 for the wear ring 41, each of the wear rings 41 and 42 is not a continuous ring but is interrupted. There are fifty-seven of the balls 40 (see FIG. 1), which are formed of steel.

The wear ring 41 abuts a shoulder 43 in the portion 18 of the second body 12. The shoulder 43, which is substantially parallel to the shoulder 39, connects the outer surfaces 30 and 31 of the second body 12.

The wear ring 42 fits around the outer surface 31 of the second body 12 and is held against the balls 40 by a face 44 of a retainer 45. The retainer 45 has threads 46 for cooperation with threads 47 on the portion 17 of the first body 11 to enable the retainer 45 to be threaded on the first body 11 until the face 44 of the retainer 45 abuts an end face 48 on the portion 17 of the first body 11. A set screw 49 holds the retainer 45 in the position in which the face 44 of the retainer 45 abuts the end face 48 of the portion 17 of the first body 11 as shown in FIG. 1. This insures that the wear ring 42 has the balls 40 bearing thereagainst.

The use of the wear rings 41 and 42 prevents any wear of the body 11 or 12 due to thrust loads. Thus, a relatively longer life of the bodies 11 and 12 is obtained.

The retainer 45 has a dust seal 50, which is preferably formed of felt, positioned in a groove 51 therein. The dust seal 50 bears against the outer surface 31 of the second body 12 to prevent any dirt from entering therebetween.

With the first body 11 connected to the pipe and the second body 12 connected to the hose reel, relative rotation between the first body 11 and the second body 12 occurs without any metal to metal contact therebetween. Furthermore, during rotation, the thrust ring 37 has a rotational force exerted against both of its faces 52 and 53, which bear against the shouler 38 on the portion 17 of the first body 11 and the shoulder 39 on the portion 18 of the second body 12, respectively.

The bearings 32 and 34 absorb all of the bending moments or loads of the swivel connector 10. Because of the relative long length of each of the bearings 32 and 34, the bending load is distributed over a relatively large area. This increases the life of the bodies 11 and 12.

Because of disposing the bearings 32 and 34 on opposite sides of the O-ring 35, the O-ring 35 is not subjected to non-uniform bending loads. Thus, the O-ring 35 has a relatively long life.

In assembling the swivel connector 10, the bearings 32 and 34 are lightly press fitted into the bores 22 and 20, respectively, in the portion 17 of the first body 11. The O-ring 35 is mounted on the portion 18 of the second body 12. Then, the thrust ring 37 is mounted on the outer surface 29 of the portion 18 of the second body 12.

After the O-ring 35 and the thrust ring 37 have been disposed on the portion 18 of the second body 12, the portion 18 of the second body 12 is inserted within the portion 17 of the first body 11. Then, the wear ring 41 is mounted on the outer surface 31 of the second body 12. The balls 40 are next disposed between the outer surface 31 of the portion 18 of the second body 12 and the bore 19 in the portion 17 of the first body 11. After the balls 40 have been disposed in position, the second wear ring 42 is disposed over the outer surface 31 of the second body 12.

The retainer 45, which has the dust seal 50 mounted in the groove 51, is then slid over the outer surface 31 of the second body 12 and threaded onto the end of the portion 17 of the first body 11. The retainer 45 is threaded onto the portion 17 of the first body 11 until the face 44 of the retainer 45 abuts the end face 48 on the portion 17 of the first body 11. Then, the set screw 49 is tightened to lock the retainer 45 to the first body 11. This completes the assembly of the swivel connector 10.

While the present invention has shown the passage 14 in the first body 11 as having its outlet at 90° to its inlet, it should be understood that the passage 14 could be a longitudinal passage having its longitudinal axis aligned with the longitudinal axis of the passage 15 in the second body 12. Any other angle of the passage 14 also could be utilized.

An advantage of this invention is that no lubrication is required of the bearings. Another advantage of this invention is that the bearing exposed to jet fuel is formed of a material which will not contaminate the jet fuel. A further advantage of this invention is that the bodies of the swivel connector may be formed of aluminum so as to be lightweight while still having a relatively long life. Still another advantage of this invention is that the thrust bearing does not have to support any bending load. A still further advantage of this invention is that a relatively light bending load is applied to any portion of either of the bodies of the swivel connector because of the relatively large surface areas of the bearings which support the bending load of the swivel connector.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A swivel connector including first body means; a second body; said first body means having stepped axial bore means therein; said first body means having a passage therein with one end of said passage communicating with one end of said stepped axial bore means and its other end communicating with the exterior of said first body means; said passage having a smaller diameter than the minimum diameter of said stepped axial bore means; said stepped axial bore means in said first body means having its other end communicating with the exterior of said first body means; said second body having at least a portion for disposition within said stepped axial bore means in said first body means and in radial spaced relation thereto; said second body having a passage extending therethrough and communicating with said passage in said first body means when said portion of said second body is disposed within said stepped axial bore means in said first body means to provide a continuous passage extending through said first body means and said second body; and means to rotatably connect said first body means and said second body to each other and disposed between the wall of said stepped axial bore means in said first body means and said portion of said second body, said rotatably connecting means including first and second non-metallic bearing means disposed between the wall of said stepped axial bore means in said first body means and said portion of said second body and in engagement with each to support all bending loads, a non-metallic thrust ring disposed between said first body means and said second body to absorb thrust loads produced by relative movement of said second body into said first body means, ball bearing means disposed between said first body means and said portion of said second body to support thrust loads produced by relative movement of said second body out of said first body means, and sealing means disposed between the wall of said stepped axial bore means in said first body means and said portion of said second body and in engagement with each.

2. The swivel connector according to claim 1 in which said sealing means is disposed between said first and second non-metallic bearing means.

3. The swivel connector according to claim 2 in which said first non-metallic bearing means is disposed adjacent the end of said portion of said second body disposed in said first body means, said ball bearing means is disposed closer to the other end of said stepped axial bore means in said first body means than said second non-metallic bearing means, and said non-metallic thrust ring is positioned between said second non-metallic bearing means and said ball bearing means.

4. The swivel connector according to claim 3 in which said first body means includes a first body having said stepped axial bore means and said passage and retaining means secured to said first body, and said retaining means cooperating with said first body and said second body to retain said ball bearing means therebetween.

5. The swivel connector according to claim 3 in which said ball bearing means includes a plurality of balls and first and second wear rings mounted on said second body with said balls therebetween, said second body has a flange having a pair of substantially parallel surfaces, one of said surfaces of said flange having one face of said non-metallic thrust ring bearing thereagainst, the other of said surfaces of said flange forming the sole surface against which said first wear ring bears on the opposite side of said first wear ring from said balls, said first body means includes a first body having said stepped axial bore means and said passage and retaining means secured to said first body and having a portion against which said second wear ring bears, and said balls are disposed between the wall of said stepped axial bore means in said first body and said portion of said second body.

6. The swivel connector according to claim 2 in which said ball bearing means includes a plurality of balls and first and second wear rings mounted on said second body with said balls therebetween, said second body has a flange having a pair of substantially parallel surfaces, one of said surfaces of said flange having one face of said non-metallic thrust ring bearing thereagainst, and the other of said surfaces of said flange forming the sole surface against which said first wear ring bears on the opposite side of said first wear ring from said balls, said first body means includes a first body having said stepped axial bore means and said passage and retaining means secured to said first body and having a portion against which said second wear ring bears, and said balls are disposed between the wall of said stepped axial bore means in said first body and said portion of said second body.

7. The swivel connector according to claim 2 in which each of said first non-metallic bearing means and said second non-metallic bearing means is the same length.

8. The swivel connector according to claim 2 in which each of said first non-metallic bearing means and said second non-metallic bearing means is a bearing formed of epoxy-glass filament wound composite having a liner of low friction material.

9. The swivel connector according to claim 1 in which said stepped axial bore means in said first body means comprises a plurality of stepped bores of different diameters, said portion of said second body has a plurality of stepped outer surfaces of different diameters disposed opposite said stepped bores in said first body means and surrounded thereby, said first non-metallic bearing means is disposed in a first of said bores in said first body means and engages a first of said outer surfaces of said portion of said second body, said sealing means is disposed between a second of said bores in said first body means and said first outer surface of said portion of said second body and in engagement with each, said second non-metallic bearing means is disposed in a third of said bores in said first body means and engages a second of said outer surfaces of said portion of said second body, said ball bearing means is disposed between a fourth of said bores in said first body means and a third outer surface of said portion of said second body, said first bore in said first body means has a smaller diameter than said second bore in said first body means and is further from the end of said first body means receiving said second body than said second bore, said second bore in said first body means has a smaller diameter than said third bore in said first body means and is further from the end of said first body means receiving said second body than said third bore, said third bore in said first body means has a smaller diameter than said fourth bore in said first body means and is further from the end of said first body means receiving said second body than said fourth bore, said first outer surface of said portion of said second body has a smaller diameter than said second outer surface of said portion of said second body, said second outer surface of said portion of said second body has a smaller diameter than said third outer surface of said portion of said second body, said non-metallic thrust ring is disposed between said fourth bore in said first body means and said second outer surface of said portion of said second body, said first body means has a shoulder connecting said third outer bore and said fourth outer bore, said non-metallic thrust ring has one face bearing against said shoulder of said first body means, said portion of said second body has a flange, said flange of said portion of said second body has a first surface substantially parallel to said shoulder of said first body means, and said non-metallic thrust ring has a second face bearing against said first surface of said flange of said portion of said second body.

10. The swivel connector according to claim 9 in which said ball bearing means includes a plurality of balls and first and second wear rings mounted on said second body with said balls therebetween, said flange of said second body has a second surface substantially parallel to said first surface, said second surface of said flange forms the sole surface against which said first wear ring bears on the opposite side of said first wear ring from said balls, said first body means includes a first body having said stepped axial bore means and said passage and retaining means secured to said first body and having a portion against which said second wear ring bears, and said balls are disposed between the wall of said fourth bore in said first body and said third outer surfaces of said portion of said second body.

* * * * *